Oct. 13, 1931.  H. SYNCK  1,827,215
CORN LIFTER ATTACHMENT FOR TRACTORS
Filed March 5, 1929   2 Sheets-Sheet 1
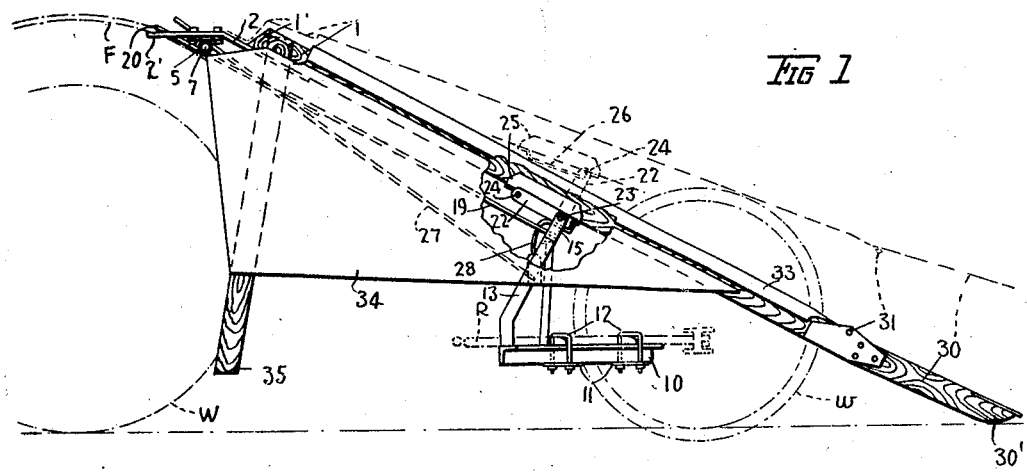
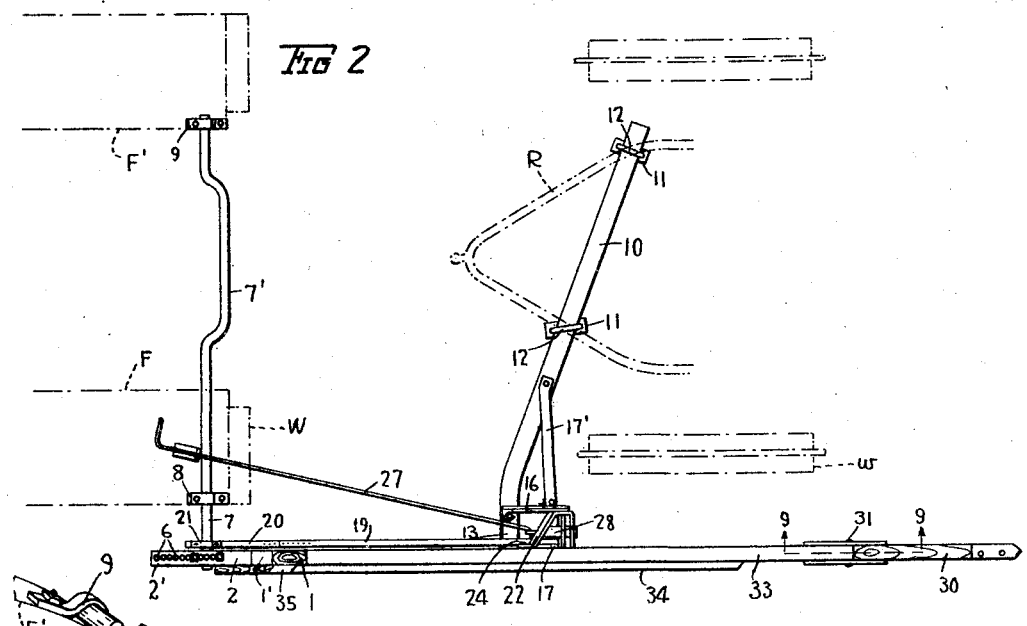
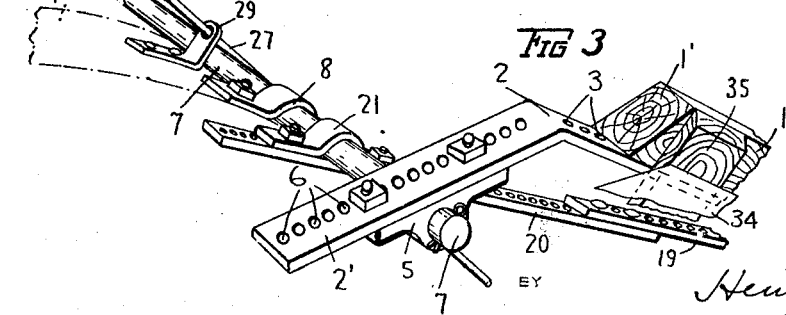
INVENTOR
Henry Synck
Staley & Welch
ATTORNEYS Oct. 13, 1931.   H. SYNCK   1,827,215
CORN LIFTER ATTACHMENT FOR TRACTORS
Filed March 5, 1929   2 Sheets-Sheet 2
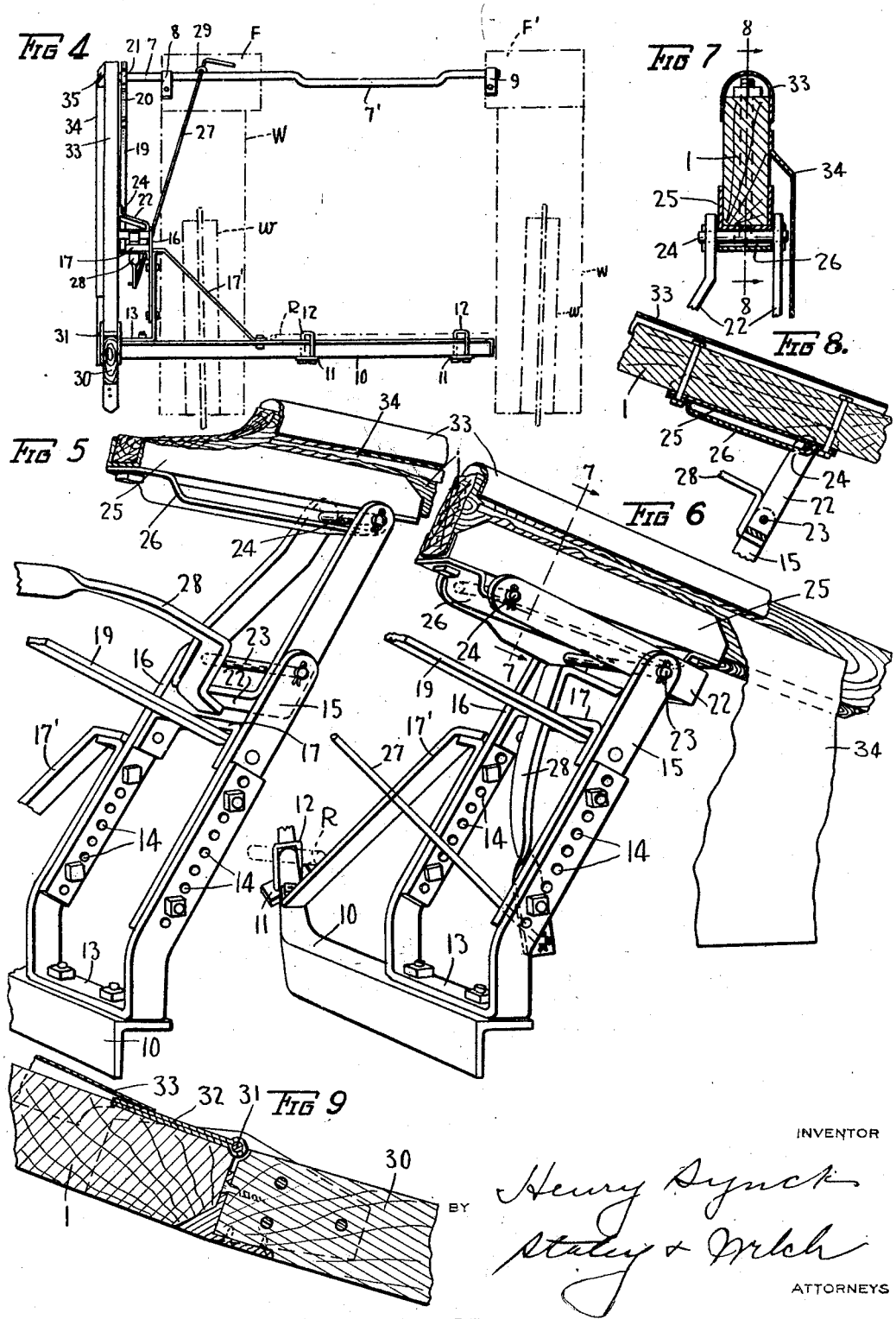

Patented Oct. 13, 1931

1,827,215

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

CORN LIFTER ATTACHMENT FOR TRACTORS

Application filed March 5 1929. Serial No. 344,177.

This invention relates to plant lifters, it especially relating to a lifting device for down corn which may be readily attached to the conventional types of farm tractors.

In harvesting corn by means of a tractor-drawn corn picker, particularly in fields in which a considerable percentage of the corn is down, much loss is occasioned by the tractor running over the down corn stalks, since the tractor must be operated near the unpicked row in order to properly position the picker apparatus.

The object of the invention is to provide a device which may be readily attached to the tractor and which will act to lift or turn the down corn out of the path of the tractor wheels and to hold the same in upright position while the tractor is passing to thereby prevent injury to the corn talks by the tractor and to act as an aid in guiding the corn stalks properly to the gathering mechanism of the picker machine.

Other objects and advantages will appear from the following description and claims.

In the accompanying drawings:

Fig. 1 is a side elevation of the improved device, the tractor to which it is attached being shown diagrammatically.

Fig. 2 is a top plan view.

Fig. 3 is a rear perspective view, enlarged, of a portion of the device.

Fig. 4 is a front elevation.

Fig. 5 is a rear perspective view, enlarged, of a portion of the device in the raised position.

Fig. 6 is a similar enlarged perspective with the parts in the lowered position.

Fig. 7 is a section on the line 7—7 of Fig. 6, in slightly reduced scale as compared to Figs. 5 and 6.

Fig. 8 is a section on the line 8—8 of Fig. 7 enlarged to the same scale.

Fig. 9 is an enlarged longitudinal section on the line 9—9 of Fig. 2.

Referring to the drawings, 1 represents a beam, in the present case of wood, which is supported from the tractor in a downwardly inclined position and in a manner which permits it to be raised and lowered. The upper end of the beam is pivotally supported from the tractor and for that purpose it is provided with a flat metallic bar 2 which has a series of openings 3 by which the bar may be adjustably secured to the beam by bolts (not shown). The bar in the present case is shown of angular form, which is the shape which enables the bar to accommodate itself to a larger number of tractors. To the rear end 2' of the bar is secured a bearing block 5, the bar being provided with a series of openings 6 to receive securing bolts to permit the block to be secured in different positions of adjustment for accommodating tractors of different wheel base. The bearing block is loosely mounted on a rod 7, which rod is of sufficient length to extend across the two fenders F and F' of the tractor, being preferably bent at an intermediate point as indicated at 7' to provide clearance for certain tractor parts. The rod is secured to the fenders by metallic clips 8 and 9 at points where the least hindrance to the attachment will be found, and by reason of the attachment of the bar to both fenders a rigid and substantial support for the upper end of the beam is provided.

The lower forward portion of the beam is supported from the tractor chassis, and in the present case from the radius rods R, such rods being provided on the majority of farm tractors to form a front axle brace. A horizontal angle bar 10 is secured by clips 11 and U-bolts 12 to the rods R so that its position can be adjustably arranged. To the outer end of this bar is fixed an adjustable bracket, this bracket consisting of a U-shaped member 13 having adjustably connected with the legs thereof members 15 and 16, said legs and members being each provided with a series of openings 14 to receive bolts whereby the height of the members 15 and 16 may be adjusted. The two members 15 and 16 are connected together by a brace 17, and the inner leg of the U-shaped member 13 is connected to the bar 10 by a brace 17'. The supporting rod 7 and the bracket are also connected together by an adjustable brace member consisting of a pair of flat bars 19 and 20, each having a series of apertures to receive bolts by which they may be adjustably secured together. The bar 20 is secured to the rod 7 by a clip 21, the bar being provided with a series of openings to receive the clip bolts to provide for adjustably securing the bar to the rod. The bar 19 is secured in any suitable manner to the brace member 17.

The beam is supported by this bracket in a manner to permit the lower end of the beam to be raised or lowered by swinging it about its pivoted connection with the rod 7. To that end there is provided a raising and lowering lever 22, which in the present case is of a U-form. The lever is pivotally mounted upon a pin 23 carried by the upper ends of the bracket members 15 and 16. The long arms of this lever carry a pin 24 which extends through a slot on the lower side of the beam formed by a U-shaped wear plate 25 and a keeper plate 26 secured to the lower side of the beam. There is connected to the cross portion of the short arms of the lever 22 an arm 28, the free end of which is pivotally connected with one end of a rod 27, the other end of the rod 27 being loosely mounted in an upturned strap 29 secured to the fender F, the end of the rod being bent to form a handle. To lower the beam to its operative position the lever 22 is rocked by the connections described to the position shown in Figs. 1 and 6 in which position it will be seen that the plate 26 rests on the pin 23 to support the beam in proper lowered position. To raise the beam for transportation purposes or to enable it to clear the forward tractor wheels in turning the tractor, the lever 22 is swung to the position shown in Fig. 5, the lever being swung until the pin 24 contacts the end of the slot, in which position it will be seen that the pin 24 has passed the vertical center line through a pivot pin 23 so that the parts will be maintained in this position.

To enable the forward end of the beam to accommodate itself to the contour of the ground or obstructions met with during the travel of the tractor it is provided with an extension 30 hinged on a pin 31 mounted in hinge straps 32 which are secured to the forward end of the beam, the joint being so arranged that the rounded nose 30' of the extension touching the ground tends to lift the extension and thus avoids breakage. When the beam is lifted the adjacent surfaces of the beam and its extension form abutments to maintain the extension in parallel relation with the beam.

For the more effective operation of the device, the upper edge of the beam is provided with a sheet metal cover 33, while a sheet metal shield 34 is secured to the side of the beam and projects downwardly therefrom. The rear end of the beam also has a downwardly extension guard finger 35 which projects below the metal shield at a point adjacent the rear tractor wheel W to prevent the possibility of corn stalks falling under the tractor wheel as they sweep from the shield. This guard finger 35 also acts as an additional support and stiffener for the shield 34 to which it is secured in any suitable manner.

In operation, the beam and its extension is lowered in the manner described, the arrangement of the parts being such that the forward end of the extension will ride upon the ground or at least run closely adjacent the ground line. As the tractor moves forward, the extension 30, which is positioned some distance in advance of the front tractor wheel w, passes under and lifts the down corn stalks which are lying in the path of the tractor wheels. It will be seen that, since the extension 30 and beam 1 are secured to the tractor so that they are in the space between the last picked row and the next unpicked row, that the angle which is assumed by the corn as the inclined upper edge of the beam advances causes the corn to ride entirely over and aside the tractor.

Having thus described my invention, I claim:

1. In a device of the character described, a plant lifter member arranged at the side of a tractor, means for supporting said lifter member from said tractor including a support secured to the radius rods of the tractor and projecting between a front and rear wheel of said tractor, and connections between said support and lifter member.

2. In a device of the character described, a plant lifter member arranged at the side of a tractor, and means for supporting said lifter member from said tractor including a support secured to the radius rods of the tractor and projecting between a front and rear wheel of said tractor, and connections between said support and lifter member, said connections including raising and lowering devices for said lifter member.

3. In a device of the character described, a plant lifter member arranged at the side of a tractor, and means for supporting said lifter member from said tractor including a support secured to the radius rods of the tractor and projecting between a front and rear wheel of said tractor, and connections between said support and lifter member, said connections including a bracket secured to said support, a lever pivoted to the upper end of said bracket, a slidable connection between one arm of said lever and said lifter member, and a manually operated device connected to the other arm of said lever.

4. In a device of the character described, a plant lifter member arranged at the side of a tractor, means for pivotally supporting the upper end of said member by said tractor, a support projecting laterally from the lower portion of said tractor, a bracket secured to the outer end of said support, a lever pivotally connected to the upper end of said bracket, a slidable connection between the free end of said lever and said member, and manually-operated means for rocking said lever.

5. In a device of the character described, a plant lifter member arranged at the side of a tractor, means for pivotally connecting the rear end of said member to the rear end of said tractor, a support at the forward end of said tractor, a vertically-extending adjustable bracket on the outer end of said support, a U-shaped lever pivotally connected with the upper end of said bracket having long and short arms, the long arms of said lever having a slidable connection with said plant lifter member, an arm connected with the short arms of said lever, and a rod connected with said arm and projecting to the rear of the tractor.

In testimony whereof, I have hereunto set my hand this 15th day of February, 1929.

HENRY SYNCK.